July 31, 1973  P. L. KAPITZA  3,749,639
METHOD AND DEVICE FOR PRODUCING THERMONUCLEAR PLASMA
Filed March 11, 1970  6 Sheets-Sheet 2

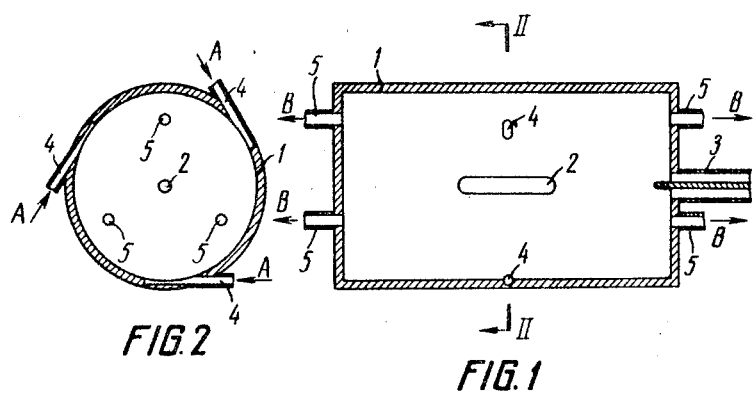
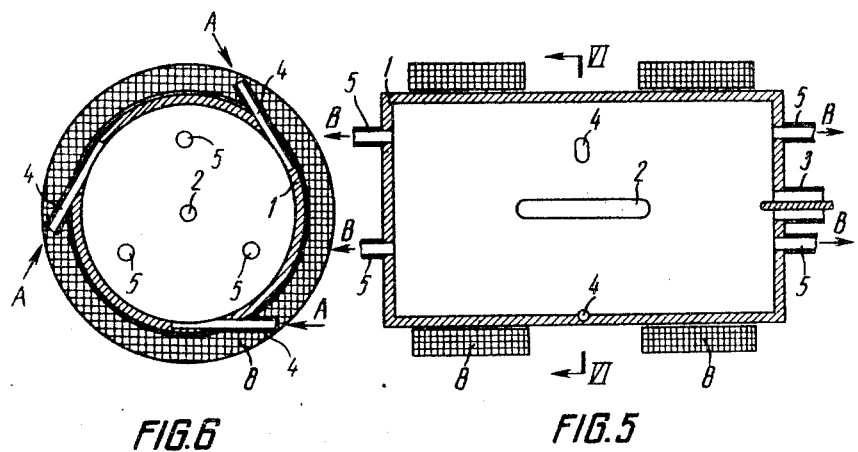

United States Patent Office

3,749,639
Patented July 31, 1973

3,749,639
METHOD AND DEVICE FOR PRODUCING
THERMONUCLEAR PLASMA
Petr Leonidovich Kapitza, Vorobievskoe Shosse 2, kv 14, Moscow, U.S.S.R.
Filed Mar. 11, 1970, Ser. No. 18,592
Claims priority, application U.S.S.R., Aug. 22, 1969, 1,347,761, 1,347,762
Int. Cl. G21b 1/00
U.S. Cl. 176—3
8 Claims

ABSTRACT OF THE DISCLOSURE

The invention relates to methods of producing a thermonuclear plasma and to devices for effecting the same. The method for producing a thermonuclear plasma according to the present invention is characterized in that an electric discharge is created by high-frequency electromagnetic oscillations of such a mode and frequency that within the discharge zone there is provided a maximum concentration of the electric field, while a gaseous working medium is compressed and rotated about the horizontal axis of the electric discharge.

According to the invention, the device for effecting the proposed method comprises a resonant cavity and a coupling element made so as to provide a maximum concentration of the electric field within the central portion of the resonant cavity and also comprises means for compression of the gaseous working medium inside the resonant cavity and for rotating it about the horizontal axis of the resonant cavity.

---

The present invention relates to methods of producing thermonuclear reactions and to devices for effecting the same. More particularly, this invention relates to methods of producing thermonuclear plasma and to devices for carrying these methods into effect which can be used both for physical study of properties and charactersitics of a high-temperature plasma and for study of chemical reactions occurring therein.

Known in the art is a method of producing a thermonuclear plasma by means of an electric discharge appearing under the action of high-frequency electromagnetic oscillations upon a working medium, for example a mixture of deuterium with tritium.

For effecting this method devices having resonant cavities have been proposed filled with a gaseous working medium and subjected to the action of high-frequency electromagnetic oscillations fed through coupling elements (cf. U.S.A. Pat. No. 3,022,236, Cl. 176–1 "Radio-Frequency Plasma Containing Device").

Employed in these devices is a spherical resonant cavity in which the gaseous working medium is under a low pressure of the order $\sim 10^{-5}$ mm. Hg, in which case it is difficult to hold the plasma and to separate it from the walls of the cavity due to numerous instabilities appearing within the plasma, destroying it, thus making it difficult to hold and heat the plasma during a prolonged time period.

An object of the present invention is to provide a method of producing a thermonuclear plasma which makes it possible to produce a steady, high-temperature, stable and dense plasma.

Another object of the invention is to provide a device for producing a thermonuclear plasma by the proposed method.

According to these and other objects, in the process of producing a thermonuclear plasma by establishing an electric discharge within a gaseous working medium, for example in a mixture of deuterium and tritium, appearing under the action of high-frequency electromagnetic oscillations, according to the invention, the working medium is compressed to a pressure approximately equal to or higher than the atmospheric pressure and is rotated about the horizontal axis of the electric discharge set up by electromagnetic oscillations of such a mode and frequency that the maximum concentration of the electric field is provided within the discharge zone.

The above method is carried into effect in the proposed device, in which an electric discharge is established within a resonant cavity filled with a working medium under the action of electromagnetic oscillations fed to the resonator through a coupling element. According to the invention, the device is provided with means for compressing the gaseous medium in the resonant cavity and for rotating it about the horizontal axis of the resonant cavity to provide for holding the discharge in the centre of the resonant cavity. The resonant cavity and the coupling element are accomplished so as to provide a maximum concentration of the electric field in the centre of the resonant cavity.

The resonant cavity may be made in the form of a hollow cylinder and this considerably simplifies its construction.

In order to reduce the end losses of energy of the electric discharge, the resonant cavity is preferably made in the form of an annular toroid.

The means for rotating the gaseous working medium may be made in the form of nozzles tangential to the resonant cavity walls so as to provide a tangential inlet of the working medium into the resonant cavity.

An advantageous solution of the problem can be obtained if, for improving the heat insulation of the plasma, particularly of its ionic component, the resonant cavity is placed into a solenoid, which, when fed with a direct current, establishes a constant magnetic field in this resonator.

To provide an additional heating of the plasma, substantially of its ionic component, the resonant cavity is preferably provided with a coil disposed inside the resonant cavity and embracing the electric discharge zone. This coil, when fed with an alternating current, establishes an A.C. magnetic field which together with the constant magnetic field creates magnetoacoustic oscillations or an adiabatic compression of the plasma.

To utilize the energy developed within the plasma in the process of a thermonuclear synthesis and carried away by the neutrons, the relation between the dimensions of the resonant cavity and the magnitude of the pressure created by the means for compressing the gaseous working medium is selected so that the length of the free path of the neutrons is less than the dimensions of the resonant cavity and that their total energy is released within the working medium surrounding the discharge.

The proposed method and the device for effecting the same make it possible to produce a steady and stable plasma capable of being heated to required high temperatures as according to the proposed method, the plasma is held due to its interaction with the surrounding dense working medium.

Other objects and advantages of the invention will be apparent from the following description of preferred forms of embodiments of the invention, reference being made to the accompanying drawings, in which:

FIG. 1 shows a proposed device for effecting the claimed method, said device having a resonant cavity in the form of a hollow cylinder (a longitudinal section);

FIG. 2 is a sectional view of the same device taken through the line II—II in FIG. 1;

FIG. 5 shows a longitudinal section of the device shown in FIG. 1 provided with a solenoid for establishing a constant magnetic field;

FIG. 6 is a sectional view of the same device taken through the line VI—VI in FIG. 5;

According to the invention, the device in all the embodiments described hereinafter comprises a resonant cavity filled with a gaseous working medium in the form of a mixture of deuterium and tritium. The resonant cavity through a coupling element is fed with high-frequency electromagnetic oscillations producing an electric discharge within the working medium. The device is additionally provided with means for compressing the gaseous working medium in the resonant cavity and for rotating it about the horizontal axis of the resonant cavity thereby holding the charge in the centre of this resonant cavity.

The resonant cavity and the coupling element are accomplished so that the maximum concentration of the electric field is provided in the centre of the resonant cavity.

The working medium may be composed of deuterium, tritium, vapours of lithium and other substances capable of forming a partially or completely ionized plasma within a predetermined temperature range.

Given below is a detailed description of the forms of embodiments of the device according to the invention used for producing thermonuclear plasma by the proposed method.

In the first embodiment of the device shown in FIGS. 1 and 2, the resonant cavity 1 is made in the form of a hollow cylinder having an electric discharge zone 2 in its centre, whereas the coupling element is made in the form of a coaxial line 3 (FIG. 1). The coupling element can also be made in the form of a waveguide. The means for compressing the gaseous working medium within the resonant cavity 1 is made in the form of a compressor (not shown) feeding the medium into the resonant cavity 1 in the direction shown by the arrows A in FIG. 2. The working medium is compressed within the resonant cavity to a pressure equal to or higher than the atmospheric pressure, depending on the prescribed parameters of the device. The means for rotating the gaseous working medium about the horizontal axis of the resonant cavity 1 is made in the form of nozzles 4 tangential to the walls of the resonant cavity 1 so as to provide a tangential inlet of the working medium into this resonant cavity. The gaseous working medium from the resonant cavity 1 is fed through the pipe branches 5 (FIG. 1) in the direction shown by the arrow B.

Figure 4:
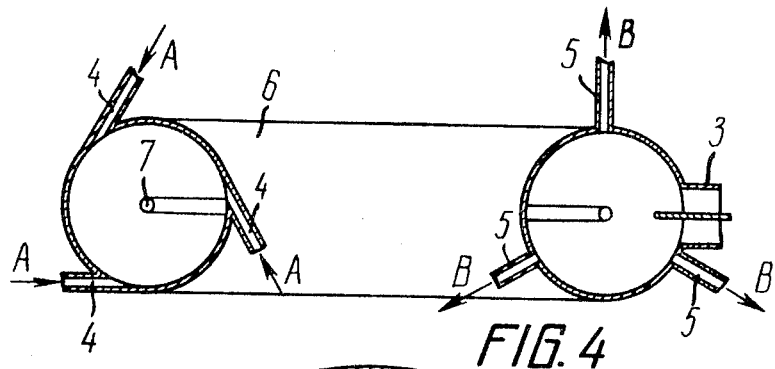
FIG. 4 is a sectional view of the same device taken through the line IV—IV in FIG. 3.
Figure 3:
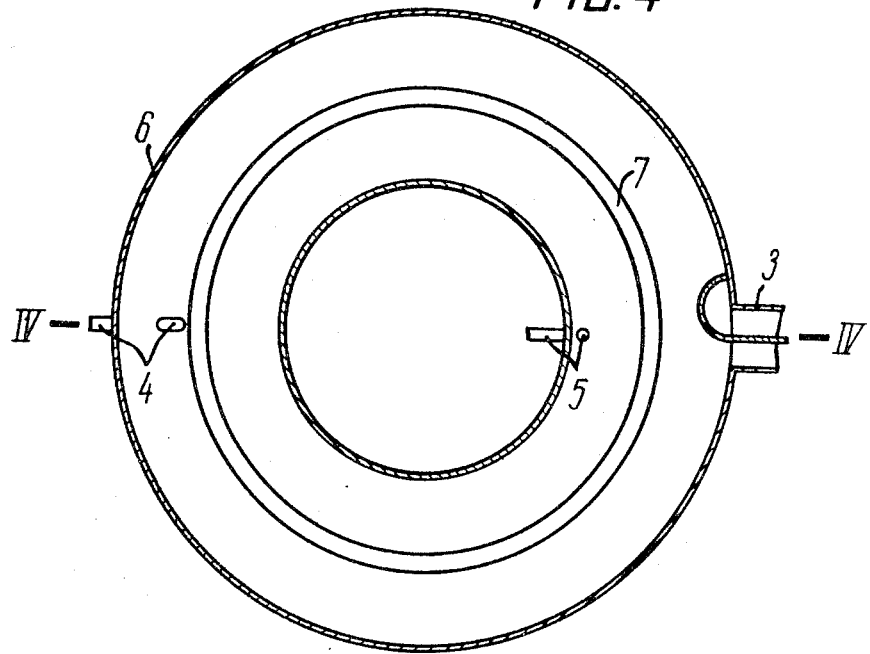
FIG. 3 shows another version of the proposed device having a resonant cavity in the form of an annular toroid (a section through the median plane of the toroid)

In the second embodiment of the invention shown in FIGS. 3 and 4 the resonant cavity 6 is made in the form of an annular toroid with an electric discharge 7 located along its axis. The coupling element and the means for compressing the working medium and for rotating it about the horizontal axis of the resonant cavity 6 are similar to those in the first embodiment.

Figure 8:
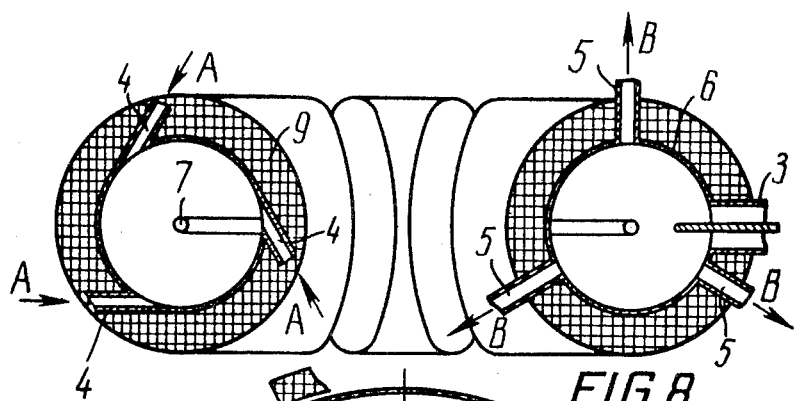
FIG. 8 is a sectional view of the same device taken through the line VIII—VIII in FIG. 7.
Figure 7:
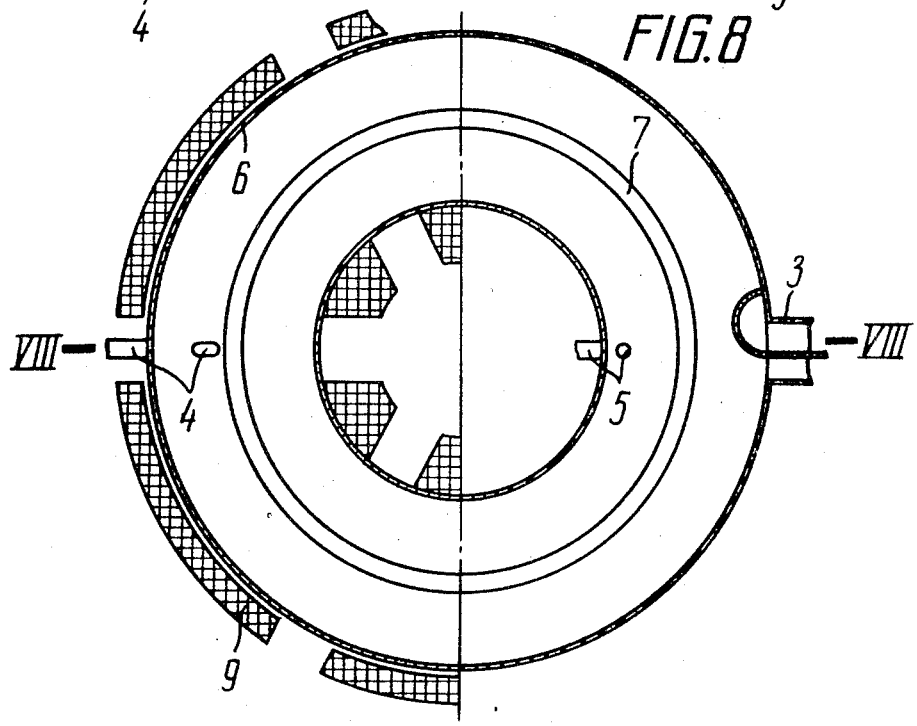
FIG. 7 shows the device having a solenoid for establishing a constant magnetic field (a section through the median plane of the toroid, the solenoid being partially in section)

The device according to the third (FIGS. 5 and 6) and fourth (FIGS. 7 and 8) embodiments is structurally the same as that according to the first and second embodiments. This device is featured by the fact that in order to establish a constant magnetic field inside the resonant cavities 1 and 6, these resonant cavities are placed into solenoids 8 and 9 respectively.

Figure 9:
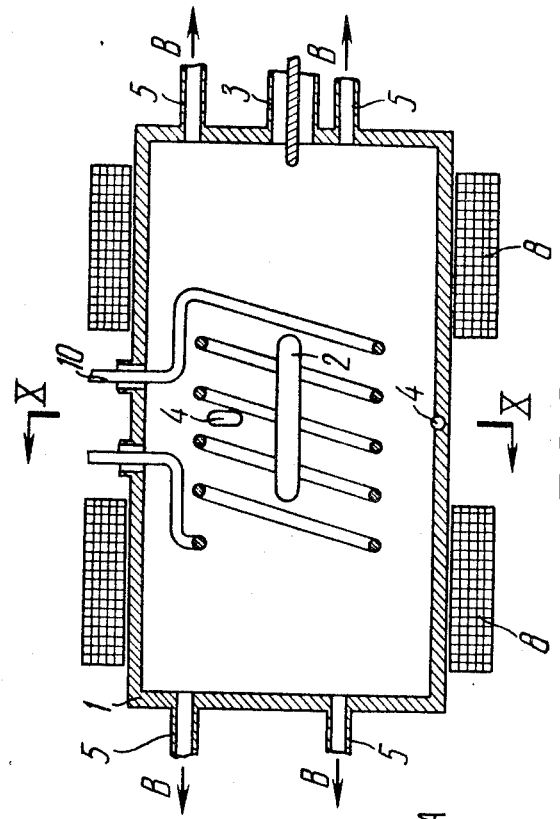
FIG. 9 shows the device according to FIG. 5 having a coil for establishing an A.C. magnetic field (a longitudinal section)
Figure 10:
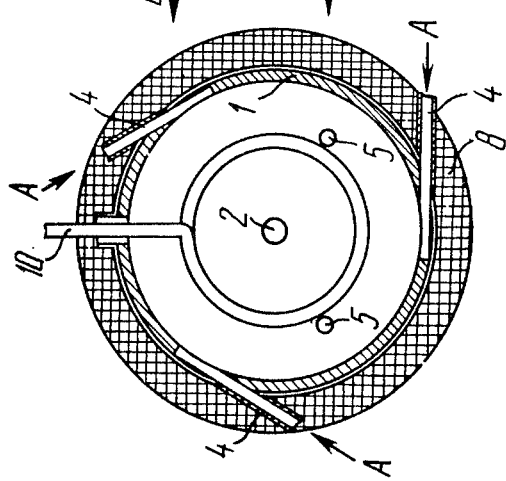
FIG. 10 is a sectional view of the same device taken through the line X—X in FIG. 9.
Figure 12:
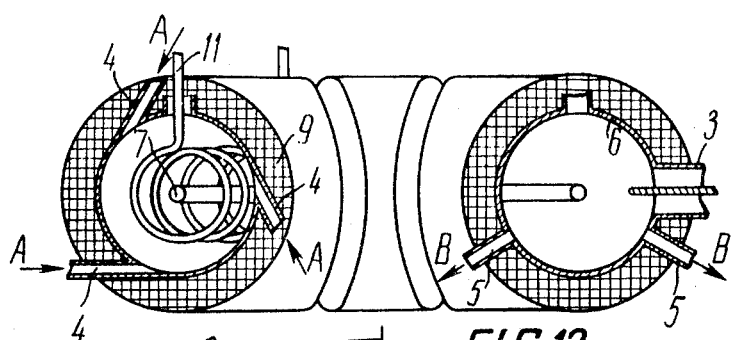
FIG. 12 is a sectional view of the same device taken through the line XII—XII in FIG. 11.
Figure 11:
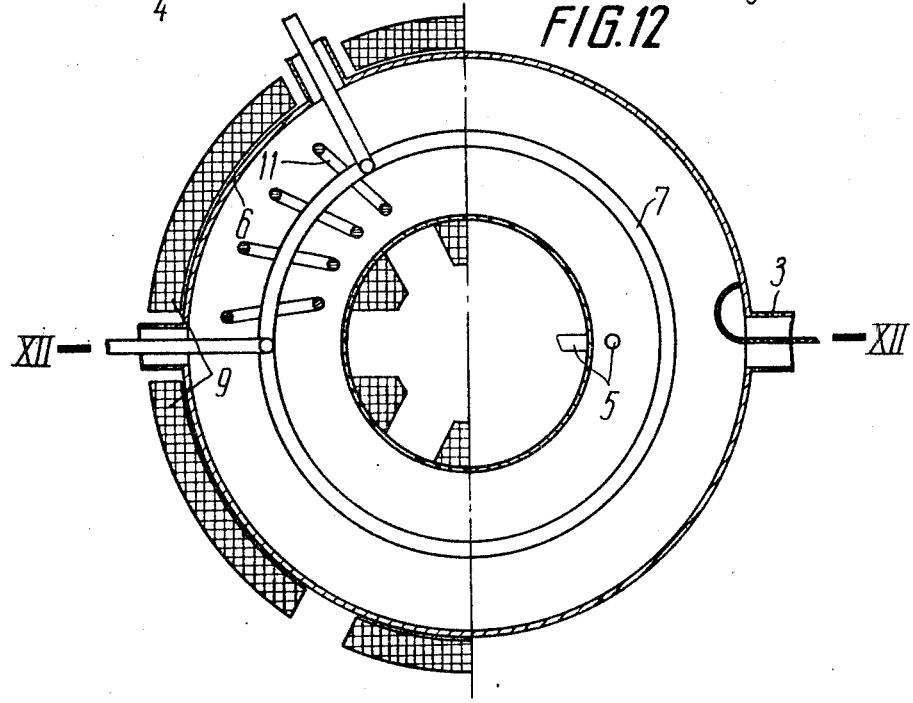
FIG. 11 shows the device according to FIG. 7 provided with a coil for establishing an A.C. magnetic field (a section through the median plane of the toroid, the solenoid being partially in section)

The device according to the fifth (FIGS. 9 and 10) and sixth (FIGS. 11 and 12) embodiments are structurally the same as those according to the third and fourth embodiments. The difference consists in that in order to establish an A.C. magnetic field within the zone of the electric discharges 2 and 7 the resonant cavities 1 and 6 are provided with coils 10 and 11, respectively. These coils are placed inside the resonant cavities and are composed of turns embracing the above zone.

To facilitate the removal of the energy produced during the thermonuclear reaction and carried away by the neutrons, in the device according to the fifth embodiment the relation between the dimensions of the resonant cavity 1 (FIG. 13) and the magnitude of the pressure created by the compressor 12 is selected so that the neutrons release the major part of their energy within the working medium. This condition for selection of the dimensions may be also applied to the resonant cavity 6. For withdrawal of this energy, the device is equipped with an external circuit which, besides a compressor 12, comprises a turbine 13, an electric generator 14 and a connecting pipeline 15.

The principle of operation of the device according to the first embodiment consists in the following.

The gaseous working medium in the form of a mixture of deuterium and tritium filling the resonant cavity 1 is compressed by a compressor to a pressure equal to or higher than the atmospheric pressure as mentioned above.

The resonator 1 through the coaxial line 3 is fed with high-frequency electromagnetic oscillations whose frequency is such that at a prescribed shape of the resonant cavity 1, the oscillations established therein are characterized by a maximum concentration of the electric field in the center of the resonant cavity 1, i.e., in the region remote from its walls. This condition is met, for example, by the oscillations of the mode $E_{01n}$, excited in the cylindrical resonant cavity 1, the index $n$ being higher than or equal to 2. In this case there are one or many maxima of the electric field (depending on the index $n$).

In one of these maxima there is ignited an electric discharge 2. The heat insulation of the plasma is provided due to the fact that the discharge 2 is removed from the walls and is freely suspended in the centre of the resonant cavity 1 wherein the energy of the electric field is concentrated in the maximum. The floating of such a discharge due to the Archimedian forces is prevented by means of rotating the working medium about the horizontal axis of the resonant cavity 1 which axis coincides with the horizontal axis of the discharge 2. The rotation of the working medium is effected by feeding it through the nozzles 4 into the resonant cavity 1. Owing to the fact that the incoming working medium has a tangential component, it acquires a rotary motion about the horizontal axis of the discharge 2. The gaseous working medium is removed from the resonant cavity 1 through the pipeline 5.

The proposed method carried into effect in the device according to the invention provides for a good heat insulation of the electrons due to the physical processes on the boundary of the plasma with the working medium surrounding the discharge 2 and insulating it from the walls of the resonant cavity 1. The electric discharge 2 has substantially a shape of an ellipse transforming into a pinch having well defined boundaries.

In addition to the described device, the proposed method is also carried into effect by a device made according to FIGS. 3 and 4. All members of this device and their action are the same as those described above, but in this case the resonant cavity 6 has a shape not of a cylinder but of an annular toroid. The mode of high-frequency electromagnetic oscillations in the resonant cavity 6 is selected like in the case of the cylindrical resonant cavity 1, namely these are the oscillations with a longitudinal component of the electric field and with a maximum concentration of this field on the horizontal axis of the resonant cavity 6 within the region of the electric discharge 7. In this case the electric discharge 7 has a shape of a closed ring.

Thus, owing to the fact that the discharges 2 and 7 do not touch the walls of the resonant cavities 1 and 6, a completely ionized plasma is produced in these discharges, the temperature of the plasma being sufficiently high so that thermonuclear reaction occurs in the mixture of deuterium with tritium.

To facilitate the conditions for the initiation of the thermonuclear reaction, it is expedient to employ the devices shown in FIGS. 5 to 8. The operation of these devices is similar to those described above, the only difference consisting in that the discharges 2 and 7 are placed into a constant magnetic field created by the direct current flowing through the solenoids 8 and 9, embracing the resonant cavities 1 and 6 respectively. This makes it possible to reduce the heat conduction of the plasma and to increase the effectiveness of its heating by a high-frequency field. The efficiency of the device can be increased by using a super-conducting solenoid instead of the usual one.

If a further increase of the temperature is required, it is advisable to use the devices shown in FIGS. 9 to 12. In these devices the additional heating of the plasma is provided either by magnetoacoustic oscillations or by an adiabatic compression.

This is achieved due to the fact that superposed on the constant magnetic field in the same direction is a component of an A.C. magnetic field, the magnitude of this component being periodically varied. In this case the pressure on the surface of the plasma is changed proportionally to the value of the magnetic field, these changes being multiplied by the magnitude of changing this field. This variable component of the field is provided the coils 10 and 11 which, as stated above, consist of turns surrounding the zone of the discharges 2 and 7, while not touching them, and being located inside the resonant cavities 1 and 6 orthogonally to the lines of force of the electric field to avoid any disturbance of the high-frequency field.

When an alternating current flows through the coils 10 and 11, magnetoacoustic waves are created in the discharges 2 and 7. If the coils 10 and 11 are fed with strong current pulses, an adiabatic compression of the plasma occurs.

By using the proposed method it is possible not only to provide for the conditions for initiation of a thermonuclear reaction, but also to ensure the effective removal of the released energy.

Figure 13:
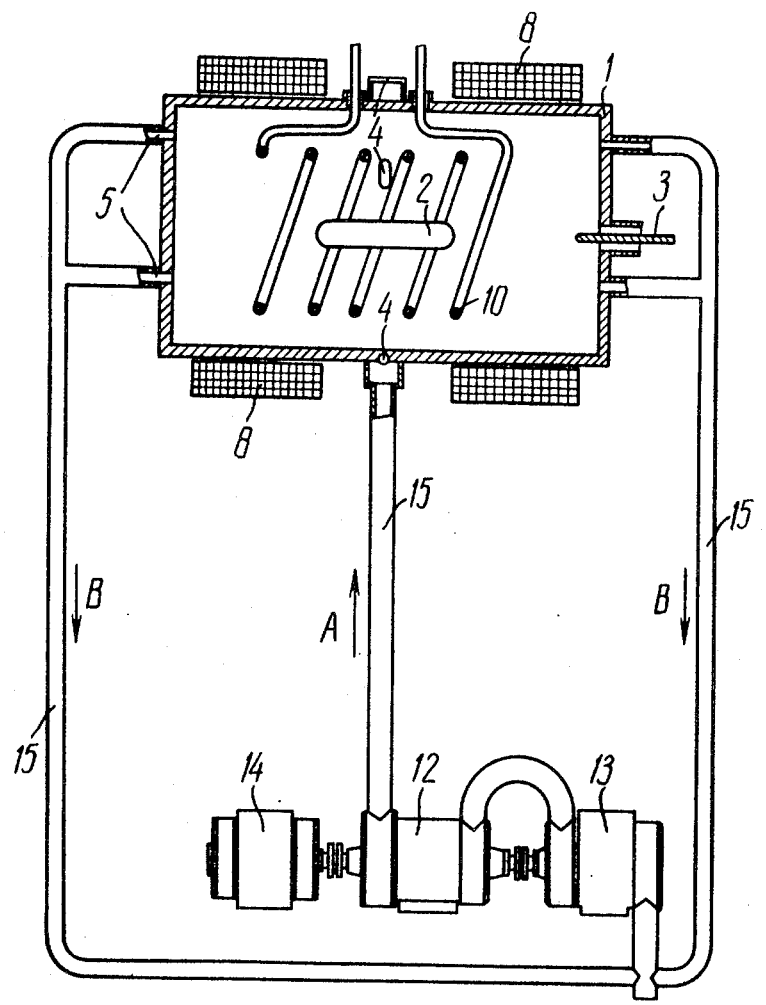
FIG. 13 is a general diagrammatic view of the device shown in FIG. 9 provided with an external circuit to release the energy carried away by the thermonuclear neutrons from the discharge zone (a longitudinal section of the resonant cavity and a general view of the common circuit).

For this purpose, in the device shown in FIG. 13 the relation between the dimensions of the resonant cavity 1 and the value of pressure of the working medium is selected as described above so that the neutrons released during the reaction have a length of the free path lower than the dimensions of the resonant cavity 1, therefore, they give up the greater part of their energy to the gaseous working medium filling the resonant cavity 1. The power consumed for heating the working medium is then utilized in the external circuit in the process of circulation of this medium. In the turbine 13 the heated working medium fed from the resonant cavity 1 is subjected to adiabatic expansion, while in the compressor 12 the medium is isothermally compressed to a working pressure in the resonant cavity 1, into which the medium is fed again. The power of the turbine, except for the power consumed by the compressor 12, is utilized in the electric generator 14 and through an electric power line is directed to consumers.

The proposed method and the device for carrying this method into effect open a new way for obtaining controllable reactions of a thermonuclear synthesis, therefore, offers wide possibilities in the use of thermonuclear energy.

I claim:

1. A method of producing a thermonuclear plasma, in which an electric discharge is generated along a substantially horizontal axis in a gaseous working medium constituted of substantially a mixture of deuterium with tritium, comprising subjecting said medium in a resonant cavity through a coupling element to the action of high-frequency electromagnetic oscillations of such a mode and frequency so as to establish a maximum concentration of an electric field within the zone of said discharge, compressing said working medium to provide a pressure at least equal to or higher than atmospheric pressure, and rotating said compressed medium about the horizontal axis of said electric discharge.

2. A device for producing a thermonuclear plasma by establishing an electric discharge in a gaseous working medium constituted of substantially a mixture of deuterium with tritium, appearing under the action of high-frequency electromagnetic oscillations comprising in combination: a resonant chamber adapted to be filled with said gaseous working medium; a coupling element connected to said chamber through which high-frequency electromagnetic oscillations are fed into said resonant chamber; said resonant chamber and coupling element being made so as to provide a maximum concentration of an electric field in the center of said resonant cavity within the zone of said electric discharge; means for compressing said gaseous working medium within said resonant chamber; and means for rotating said gaseous working medium about the horizontal axis of said resonant chamber so as to maintain said electric discharge in the center of said resonant chamber.

3. A device as claimed in claim 2, in which said resonant chamber is made in the form of a hollow cylinder.

4. A device as claimed in claim 2, in which said resonant chamber is made in the form of an annular toroid.

5. A device as claimed in claim 2, in which said means for rotating said gaseous working medium is made in the form of nozzles located tangentially to the walls of said resonant chamber so as to provide a tangential inlet of said working medium into said resonant chamber.

6. A device as claimed in claim 2, in which said resonant chamber is placed into a solenoid establishing a constant magnetic field within said chamber when a direct current flows through said solenoid.

7. A device as claimed in claim 6, in which arranged inside said resonant chamber is a coil embracing the zone of said electric discharge and, when fed with an alternating current, establishing an A.C. magnetic field within the zone of this discharge, said A.C. field together with said constant magnetic field producing magnetoacoustic oscillations or an adiabatic compression of said plasma.

8. A device as claimed in claim 2, in which the relation between the dimensions of said resonant chamber and the magnitude of the pressure developed by said means for compressing said gaseous working medium inside said resonant chamber is selected so that the neutrons passing the free path do not come beyond the limits of said resonant chamber.

References Cited

UNITED STATES PATENTS

| | | | |
|---|---|---|---|
| 3,029,361 | 4/1962 | Hernquist | 176—1 |
| 3,031,399 | 4/1962 | Warnecke et al. | 176—2 |
| 3,105,803 | 10/1963 | Weibel | 176—2 |
| 3,160,566 | 12/1964 | Dandl et al. | 176—7 |
| 3,418,206 | 12/1968 | Hall et al. | 176—2 |
| 3,425,902 | 2/1969 | Consoli et al. | 176—7 |
| 3,500,077 | 3/1970 | Post | 176—7 |
| 3,071,525 | 1/1963 | Christofilos | 176—4 |

REUBEN EPSTEIN, Primary Examiner

U.S. Cl. X.R.

176—2, 7; 315—111